(12) United States Patent
Zhou et al.

(10) Patent No.: US 12,212,511 B2
(45) Date of Patent: Jan. 28, 2025

(54) DETERMINING AN APPLICABLE TIME FOR A PATHLOSS REFERENCE SIGNAL

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/248,183

(22) Filed: Jan. 13, 2021

(65) Prior Publication Data

US 2021/0266127 A1    Aug. 26, 2021

Related U.S. Application Data

(60) Provisional application No. 62/980,864, filed on Feb. 24, 2020.

(51) Int. Cl.
| | |
|---|---|
| *H04L 5/00* | (2006.01) |
| *H04L 43/16* | (2022.01) |
| *H04W 24/08* | (2009.01) |
| *H04W 52/24* | (2009.01) |
| *H04W 56/00* | (2009.01) |

(52) U.S. Cl.
CPC ............ *H04L 5/0048* (2013.01); *H04L 43/16* (2013.01); *H04W 24/08* (2013.01); *H04W 52/242* (2013.01); *H04W 56/001* (2013.01)

(58) Field of Classification Search
CPC ................................. H04L 5/00; H04W 56/00
See application file for complete search history.

(56) References Cited

U.S. PATENT DOCUMENTS

| 10,797,762 | B1 * | 10/2020 | Sung ..................... H04B 7/0617 |
| 2015/0139003 | A1 * | 5/2015 | Takahashi ........... H04W 52/242 370/252 |
| 2017/0195974 | A1 * | 7/2017 | Huang ................. H04W 52/146 |
| 2017/0245158 | A1 * | 8/2017 | Xiao ..................... H04W 28/04 |
| 2017/0295576 | A1 * | 10/2017 | Fukuta .................. H04W 24/10 |
| 2018/0049137 | A1 * | 2/2018 | Li ......................... H04W 52/242 |
| 2019/0150161 | A1 * | 5/2019 | Cheng ................... H04L 5/0048 370/330 |
| 2019/0159136 | A1 * | 5/2019 | MolavianJazi ......... H04L 5/001 |
| 2019/0191386 | A1 * | 6/2019 | Dinan ................. H04W 52/242 |
| 2020/0068497 | A1 * | 2/2020 | Gong .................. H04W 52/242 |

(Continued)

FOREIGN PATENT DOCUMENTS

WO    2018228437 A1    12/2018

OTHER PUBLICATIONS

International Search Report and Written Opinion—PCT/US2021/070076—ISA/EPO—May 10, 2021.

(Continued)

*Primary Examiner* — Yee F Lam
(74) *Attorney, Agent, or Firm* — Harrity & Harrity, LLP

(57) ABSTRACT

Various aspects of the present disclosure generally relate to wireless communication. In some aspects, a user equipment (UE) may receive an activation command for a pathloss reference signal (PLRS). The UE may estimate a pathloss using the PLRS based at least in part on an applicable time for the PLRS that indicates a time at which the PLRS is to be ready for use in estimating the pathloss. Numerous other aspects are provided.

30 Claims, 5 Drawing Sheets

(56) References Cited

U.S. PATENT DOCUMENTS

| | | | |
|---|---|---|---|
| 2020/0100201 A1* | 3/2020 | Farmanbar | H04W 56/0015 |
| 2020/0314860 A1* | 10/2020 | Zhou | H04W 72/23 |
| 2020/0351794 A1* | 11/2020 | Xu | H04B 7/0874 |
| 2021/0258894 A1* | 8/2021 | Yao | H04W 52/10 |
| 2023/0023600 A1* | 1/2023 | Cirik | H04W 52/242 |

OTHER PUBLICATIONS

NTT DOCOMO: et al., "Remaining Issues on Multi-Beam Operation", 3GPP Draft, 3GPP TSG RAN WG1 Meeting #100-e, R1-2000926, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24-Mar. 6, 2020, Feb. 14, 2020 (Feb. 14, 2020), XP051853104, 10 Pages, Retrieved from the Internet: URL: https://ftp.3gpp.org/tsg_ran/WG1_RL1/TSGR1_100_e/Docs/R1-2000926.zip. R1-2000926.docx [retrieved on Feb. 14, 2020] 8.10.2 "Known conditions for TCI state".

Qualcomm Incorporated: "Enhancements on Multi-Beam Operation", 3GPP Draft, 3GPP TSG RAN WG1 Meeting #100-e, R1-2000975, 3rd Generation Partnership Project (3GPP), Mobile Competence Centre, 650, Route Des Lucioles, F-06921 Sophia-Antipolis Cedex, France, vol. RAN WG1, No. Feb. 24-Mar. 6, 2020, Feb. 15, 2020 (Feb. 15, 2020), XP051853548, 3 Pages, Retrieved from the Internet: URL: https://ftp.3gpp.org/tsg_ran/WG1_RL1/TSGR1_100_e/Docs/R1-2000975.zip. R1-2080975 Enhancements on Multi-beam Operation.docx retrieved on Feb. 15, 2020] 3. Activation Time for Pathloss RS, the whole document.

Samsung: "Enhancements on MIMO for NR", RP-192434, 3GPP TSG RAN Meeting #86, Sitges, Spain, Dec. 9-12, 2019, Dec. 12, 2019, 28 Pages, XP051835463, Retrieved from the Internet: URL:https://ftp.3gpp.org/tsg_ran/TSG_RAN/TSGR_86/Docs/RP-192434.zip. RP-192434 SR for RAN-86 NR-eMIMO.docx [retrieved on Dec. 2, 2019].

ZTE: "Maintenance of Enhancements on Multi-Beam Operation", 3GPP Draft, 3GPP TSG RAN WG1 Meeting #100-e, R1-2000240, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24-Mar. 6, 2020, Feb. 15, 2020 (Feb. 15, 2020), XP051853235, 9 Pages, Retrieved from the Internet: URL: https://ftp.3gpp.org/tsg_ran/WG1_RL1/TSGR1_100_e/Docs/R1-2000240.zip. R1-2000240 Maintenance of enhancements on multi -beam operation.doc [retrieved on Feb. 15, 2020] 2.2 MAC-CE based path-loss RS update for PUSCH and SRS.

* cited by examiner

DETERMINING AN APPLICABLE TIME FOR A PATHLOSS REFERENCE SIGNAL

CROSS-REFERENCE TO RELATED APPLICATION

This patent application claims priority to U.S. Provisional Patent Application No. 62/980,864, filed on Feb. 24, 2020, entitled "DETERMINING AN APPLICABLE TIME FOR A PATHLOSS REFERENCE SIGNAL," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for determining an applicable time for a pathloss reference signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an activation command for a pathloss reference signal (PLRS); and estimating a pathloss using the PLRS based at least in part on an applicable time for the PLRS that indicates a time at which the PLRS is to be ready for use in estimating the pathloss.

In some aspects, a UE for wireless communication may include a memory and one or more processors operatively coupled to the memory. The memory and the one or more processors may be configured to receive an activation command for a PLRS; and estimate a pathloss using the PLRS based at least in part on an applicable time for the PLRS that indicates a time at which the PLRS is to be ready for use in estimating the pathloss.

In some aspects, a non-transitory computer-readable medium may store one or more instructions for wireless communication. The one or more instructions, when executed by one or more processors of a UE, may cause the one or more processors to receive an activation command for a PLRS; and estimate a pathloss using the PLRS based at least in part on an applicable time for the PLRS that indicates a time at which the PLRS is to be ready for use in estimating the pathloss.

In some aspects, an apparatus for wireless communication may include means for receiving an activation command for a PLRS; and means for estimating a pathloss using the PLRS based at least in part on an applicable time for the PLRS that indicates a time at which the PLRS is to be ready for use in estimating the pathloss.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
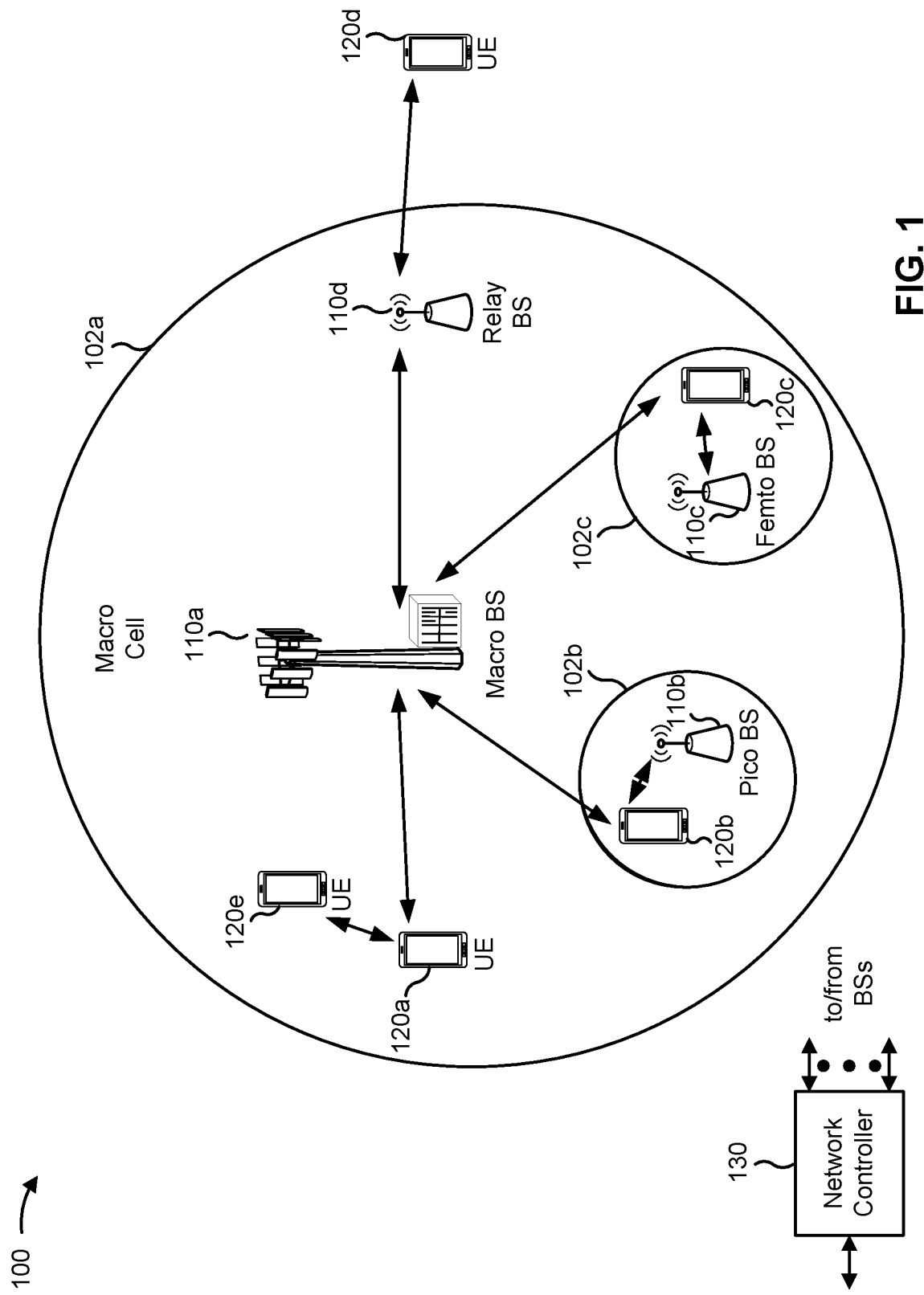
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of base stations (BSs) 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Wireless communication devices, such as UEs 120, BSs 110, TRPs, and/or the like, may communicate with each other using beams. A beam may be defined using a transmission configuration indicator (TCI) state. A TCI state for a beam may indicate a source reference signal and a quasi-co-location (QCL) type to be used for the beam. The QCL type may correspond to one or more QCL relationships that indicate how the source reference signal is to be quasi-co-located (QCLed) with a channel on the beam. Two antenna ports are said to be QCLed if properties of the channel over which a symbol on one antenna port (e.g., the channel on the beam) is conveyed can be inferred from the channel over which a symbol on the other antenna port is conveyed (e.g., the source reference signal). Examples of QCL relationships that can be bundled in QCL types include Doppler shift, Doppler spread, average delay, delay spread, and a spatial receive parameter. Thus, properties of the beam can be derived from the properties of the source reference signal.

In some cases, a UE 120 and a BS 110 may perform beam management to establish and/or refine beams for communication between the UE 120 and the BS 110. Beam management may enable intra-cell mobility (e.g., as a physical orientation of a UE 120 changes, as clusters or blocking objects in the channel change, and/or the like) and inter-cell mobility (e.g., when a UE 120 is handed over from one BS 110 to another BS 110 in the wireless network 100 or another wireless network), among other procedures.

As indicated above, FIG. 1 is provided as an example. Other examples may differ from what is described with regard to FIG. 1.

Figure 2:
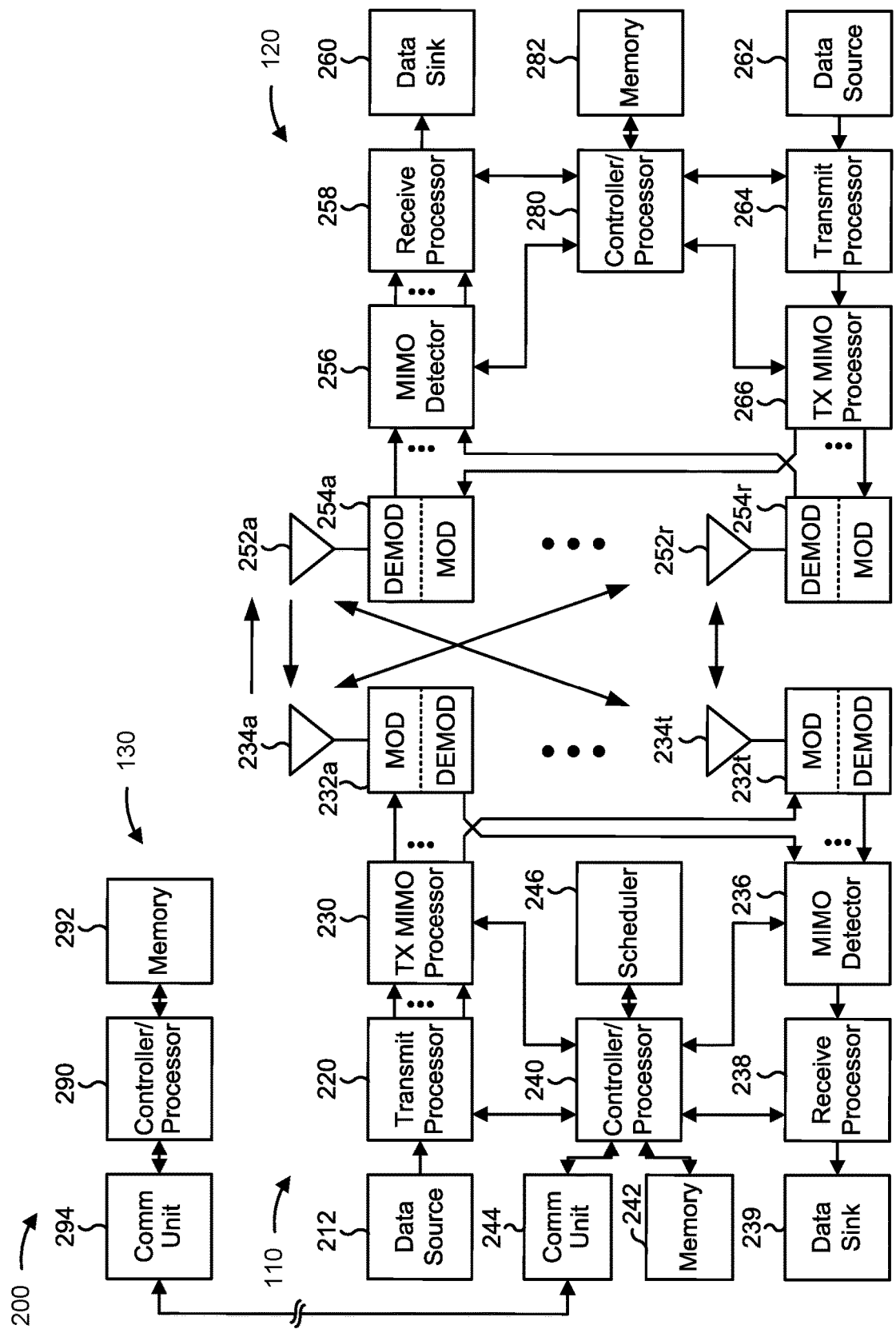
FIG. 2 is a block diagram illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with determining an applicable time for a pathloss reference signal (PLRS), as described in more detail elsewhere herein. For example, controller/processor 240 of base station 110, controller/processor 280 of UE 120, and/or any other component(s) of FIG. 2 may perform or direct operations of, for example, process 300 of FIG. 3, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 300 of FIG. 3, and/or other processes as described herein. A scheduler 246 may schedule UEs for data transmission on the downlink and/or uplink.

In some aspects, UE 120 may include means for receiving an activation command for a PLRS, means for estimating a pathloss using the PLRS based at least in part on an applicable time for the PLRS that indicates a time at which the PLRS is to be ready for use in estimating the pathloss, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some circumstances, a beam configuration for a UE may change frequently. For example, a UE may encounter frequent blockages or may change position or orientation quickly. When a beam changes, a BS may switch an active beam configuration from one beam configuration to another beam configuration. For example, the beam configuration may include a PLRS configuration, and/or the like. This may be referred to as activating the PLRS configuration. In some aspects, the BS and/or the UE may use the PLRS to track, manage, and compensate for mobility of the BS and/or the UE in the wireless network. For example, the BS may configure PLRS parameters that indicate the time-frequency resources and/or the beams on which the BS is to transmit the PLRS, that configure periodic, semi-persistent, or aperiodic transmission of the PLRS, and/or the like.

A UE may determine a time that a PLRS is to be ready for use in estimating a pathloss of a channel. This time may be referred to as an applicable time, or an application time, of the PLRS. The UE may determine an applicable time for a PLRS based at least in part on whether a TCI state configured for the PLRS is known to the UE or not known to the UE. For example, the applicable time for the PLRS may be longer when the TCI state is not known to the UE to permit sufficient time for beam refinement operations.

However, in some cases, a PLRS, such as a synchronization signal block (SSB), or a periodic channel state information reference signal (CSI-RS), may not be configured with a TCI state. Accordingly, a UE may not be enabled to determine an applicable time for some PLRSs. This may impair pathloss estimation, delay pathloss estimation, impair performance of communications (e.g., due to unsuitable power control configurations), and/or the like. Some techniques and apparatuses described herein enable a UE (e.g., UE 120) to determine an applicable time for a PLRS that is not configured with a TCI state.

In some aspects, a BS 110 may transmit (e.g., using controller/processor 240, transmit processor 220, TX MIMO processor 230, MOD 232, antenna 234, and/or the like), and a UE 120 may receive (e.g., using antenna 252, DEMOD 254, MIMO detector 256, receive processor 258, controller/processor 280, reception component 404, and/or the like), an activation command for a PLRS (e.g., an activation command for a PLRS configuration). For example, the UE 120 may receive the activation command via a medium access control control element (MAC-CE). The activation command may relate to activating a PLRS or updating a PLRS that is activated. In some aspects, the PLRS that is to be activated is not configured with a TCI state. For example, the PLRS may be an SSB or a CSI-RS (e.g., a periodic CSI-RS).

In some aspects, the UE 120 may determine (e.g., using controller/processor 280, determination component 406, and/or the like) an applicable time for the PLRS, which may be configured without a TCI state. In some aspects, the UE 120 may determine the applicable time according to criteria that the UE 120 uses to determine the applicable time when a PLRS is configured with a TCI state, and the TCI state is known to the UE 120. For example, the UE 120 may determine that the applicable time for the PLRS is after (e.g., in a next slot) the UE 120 transmits acknowledgment (ACK) feedback for the activation command. As another example, the UE 120 may determine that the applicable time for the PLRS is after (e.g., in a next slot) a threshold quantity of measurement samples of the PLRS are taken by the UE 120. In some aspects, for example, the threshold quantity of measurement samples is a fifth measurement sample.

In some aspects, counting of the threshold quantity of measurement samples begins after the UE 120 transmits ACK feedback for the activation command (e.g., after the UE 120 transmits ACK feedback for the physical downlink shared channel (PDSCH) carrying the MAC-CE that indicates the activation command for the PLRS). In other words, the UE 120 may begin counting measurement samples (e.g., for counting up to the threshold quantity of measurement samples) at a first measurement sample after ACK feedback for the activation command is sent.

In some aspects, the UE 120 may determine the applicable time for the PLRS according to criteria that the UE 120 uses to determine the applicable time when a PLRS is configured with a TCI state, and the TCI state is not known to the UE 120. For example, the UE 120 may determine that the applicable time for the PLRS is after (e.g., in a next slot) a particular duration after the threshold quantity of measurement samples of the PLRS are taken by the UE 120 (or after a particular duration after the UE transmits ACK feedback for the activation command), as described above. In some aspects, the particular duration corresponds to a duration used for layer 1 (L1) reference signal received power (RSRP) reporting (e.g., TL1-RSRP as defined in 3GPP Technical Specification 38.133, section 8.10.3).

In some aspects, the UE 120 may determine the applicable time for the PLRS based at least in part on whether the PLRS is known or not known to the UE 120. In some aspects, the UE 120 may determine that the PLRS is known when the activation command for the PLRS is received during a particular period of time (e.g., a previous X seconds) from a last transmission of the PLRS by the BS 110. Additionally, or alternatively, the UE 120 may determine that the PLRS is known when at least one measurement report for the PLRS has been transmitted previously by the UE 120. Additionally, or alternatively, the UE 120 may determine that the PLRS is known when at least one of the PLRS or a QCLed source SSB is detectable by the UE 120 during a switching period associated with the PLRS (e.g., a switching period for the UE 120 to switch from a previously-active PLRS to the PLRS), and a signal-to-noise (SNR) ratio, associated with the PLRS, satisfies a threshold value. In some aspects, the threshold value for the SNR ratio is −3 decibels (i.e., SNR≥−3 decibels).

In some aspects, the UE 120 may determine that the PLRS is known to the UE 120 (e.g., according to the criteria described above). In this case, the UE 120 may determine the applicable time according to criteria that the UE 120 uses to determine the applicable time when a PLRS is configured with a TCI state, and the TCI state is known to the UE 120, as described above. For example, when the PLRS is known to the UE 120, the UE 120 may determine that the applicable time for the PLRS is after a threshold quantity of measurement samples of the PLRS are taken by the UE 120 (e.g., after a fifth measurement sample is taken, counting from after ACK feedback for the activation command is sent), as described above.

In some aspects, the UE 120 may determine that the PLRS is not known to the UE 120 (e.g., when none of the criteria described above, for determining when the PLRS is known, is satisfied). In this case, the UE 120 may determine the applicable time for the PLRS according to criteria that the UE 120 uses to determine the applicable time when a PLRS is configured with a TCI state, and the TCI state is not known to the UE 120, as described above. For example, when the PLRS is not known to the UE 120, the UE 120 may determine that the applicable time for the PLRS is after a particular duration after the threshold quantity of measurement samples of the PLRS are taken by the UE 120, as described above.

In some aspects, the UE 120 may determine the applicable time for the PLRS, as described above, when the PLRS is a particular physical layer type of PLRS, such as an SSB or a periodic CSI-RS. In some aspects, the UE 120 may determine (e.g., using controller/processor 280, determination component 406, and/or the like) that the applicable time for the PLRS has occurred. For example, the UE 120 may determine that the threshold quantity of measurement samples have been taken by the UE 120. As another example, the UE 120 may determine that the threshold quantity of measurement samples have been taken by the UE 120, and the particular duration, after taking the threshold quantity of measurement samples, has elapsed. In this case, the UE 120 may estimate (e.g., using controller/processor 280, determination component 406, and/or the like) a pathloss (e.g., a pathloss of a channel) using the PLRS activated by the activation command. In this way, accuracy of the pathloss estimate may be improved.

Figure 3:
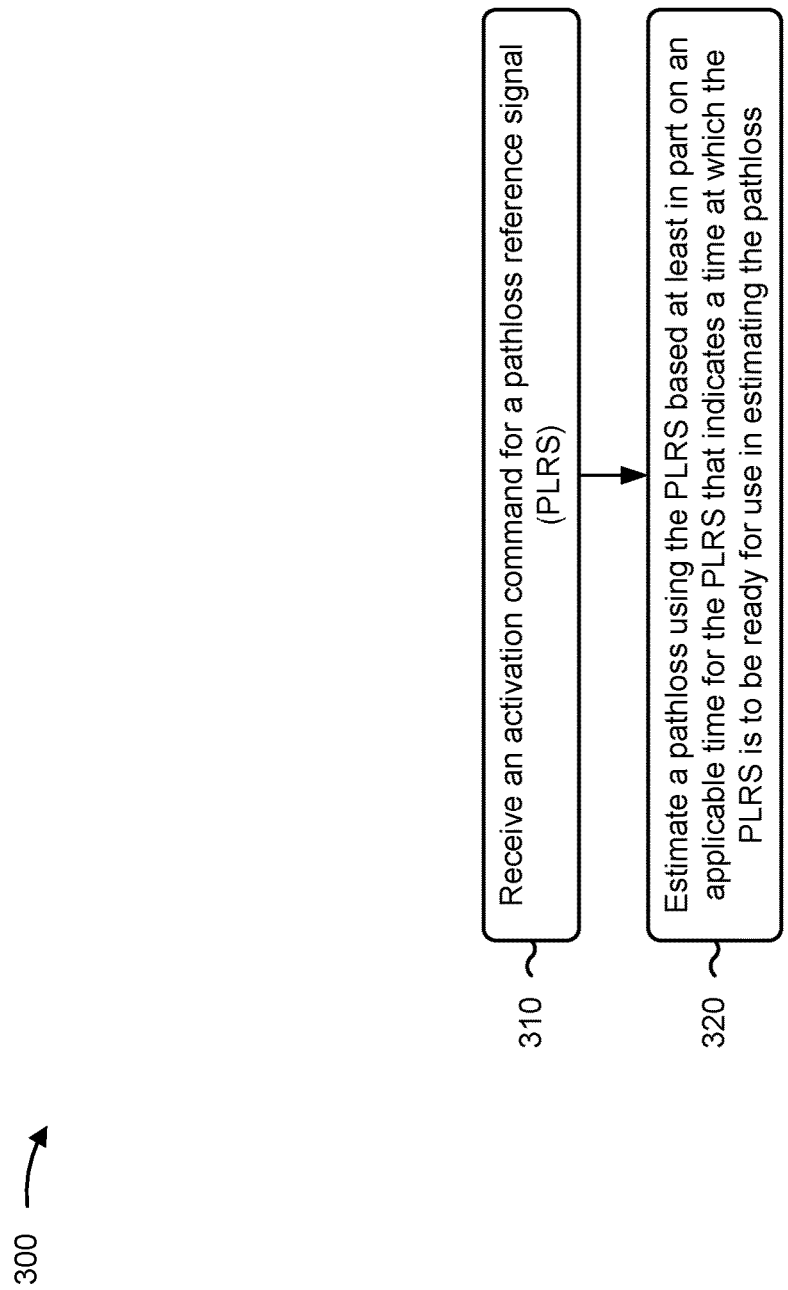
FIG. 3 is a diagram illustrating an example process performed, for example, by a UE, in accordance with various aspects of the present disclosure.

FIG. 3 is a diagram illustrating an example process 300 performed, for example, by a UE, in accordance with various aspects of the present disclosure. Example process 300 is an example where the UE (e.g., UE 120, and/or the like) performs operations associated with determining an applicable time for a PLRS.

As shown in FIG. 3, in some aspects, process 300 may include receiving an activation command for a PLRS (block 310). For example, the UE (e.g., using antenna 252, DEMOD 254, MIMO detector 256, receive processor 258, controller/processor 280, and/or the like) may receive an activation command for a PLRS, as described above.

As further shown in FIG. 3, in some aspects, process 300 may include estimating a pathloss using the PLRS based at least in part on an applicable time for the PLRS that indicates a time at which the PLRS is to be ready for use in estimating the pathloss (block 320). For example, the UE (e.g., using controller/processor 280, and/or the like) may estimate a pathloss using the PLRS based at least in part on an applicable time for the PLRS that indicates a time at which the PLRS is to be ready for use in estimating the pathloss, as described above.

Process 300 may include additional aspects, such as any single aspect or any combination of aspects described below and/or in connection with one or more other processes described elsewhere herein.

In a first aspect, the PLRS is an SSB or a periodic CSI-RS. In a second aspect, alone or in combination with the first aspect, the activation command for the PLRS is received via a MAC-CE.

In a third aspect, alone or in combination with one or more of the first and second aspects, the applicable time is after a particular duration after acknowledgment feedback for the activation command is sent. In a fourth aspect, alone or in combination with one or more of the first and third aspects, the applicable time is after a threshold quantity of measurement samples of the PLRS are taken. In a fifth aspect, alone or in combination with one or more of the first through fourth aspects, counting of the threshold quantity of measurement samples of the PLRS begins after ACK feedback for the activation command is sent.

In a sixth aspect, alone or in combination with one or more of the first through fifth aspects, the applicable time is after a particular duration after a threshold quantity of measurement samples of the PLRS are taken. In a seventh aspect, alone or in combination with one or more of the first through sixth aspects, the particular duration corresponds to a duration used for L1 RSRP reporting.

In an eighth aspect, alone or in combination with one or more of the first through seventh aspects, the applicable time is based at least in part on a determination of whether the PLRS is known or not known to the UE. In a ninth aspect, alone or in combination with one or more of the first through eighth aspects, the PLRS is determined to be known to the UE when at least one of: the activation command for the PLRS is received during a particular period of time from a last transmission of the PLRS, at least one measurement report for the PLRS has been transmitted, or at least one of the PLRS or a QCLed source SSB is detectable during a switching period associated with the PLRS, and an SNR ratio, associated with the PLRS, satisfies a threshold value.

In a tenth aspect, alone or in combination with one or more of the first through ninth aspects, the PLRS is determined to be known to the UE, and the applicable time is after a threshold quantity of measurement samples of the PLRS are taken. In an eleventh aspect, alone or in combination with one or more of the first through tenth aspects, counting of the threshold quantity of measurement samples of the PLRS begins after acknowledgment feedback for the activation command is sent.

In a twelfth aspect, alone or in combination with one or more of the first through eleventh aspects, the PLRS is determined to be not known to the UE, and the applicable time is after a particular duration after a threshold quantity of measurement samples of the PLRS are taken. In a thirteenth aspect, alone or in combination with one or more of the first through twelfth aspects, the particular duration corresponds to a duration used for L1 RSRP reporting.

Although FIG. 3 shows example blocks of process 300, in some aspects, process 300 may include additional blocks, fewer blocks, different blocks, or differently arranged blocks than those depicted in FIG. 3. Additionally, or alternatively, two or more of the blocks of process 300 may be performed in parallel.

Figure 4:
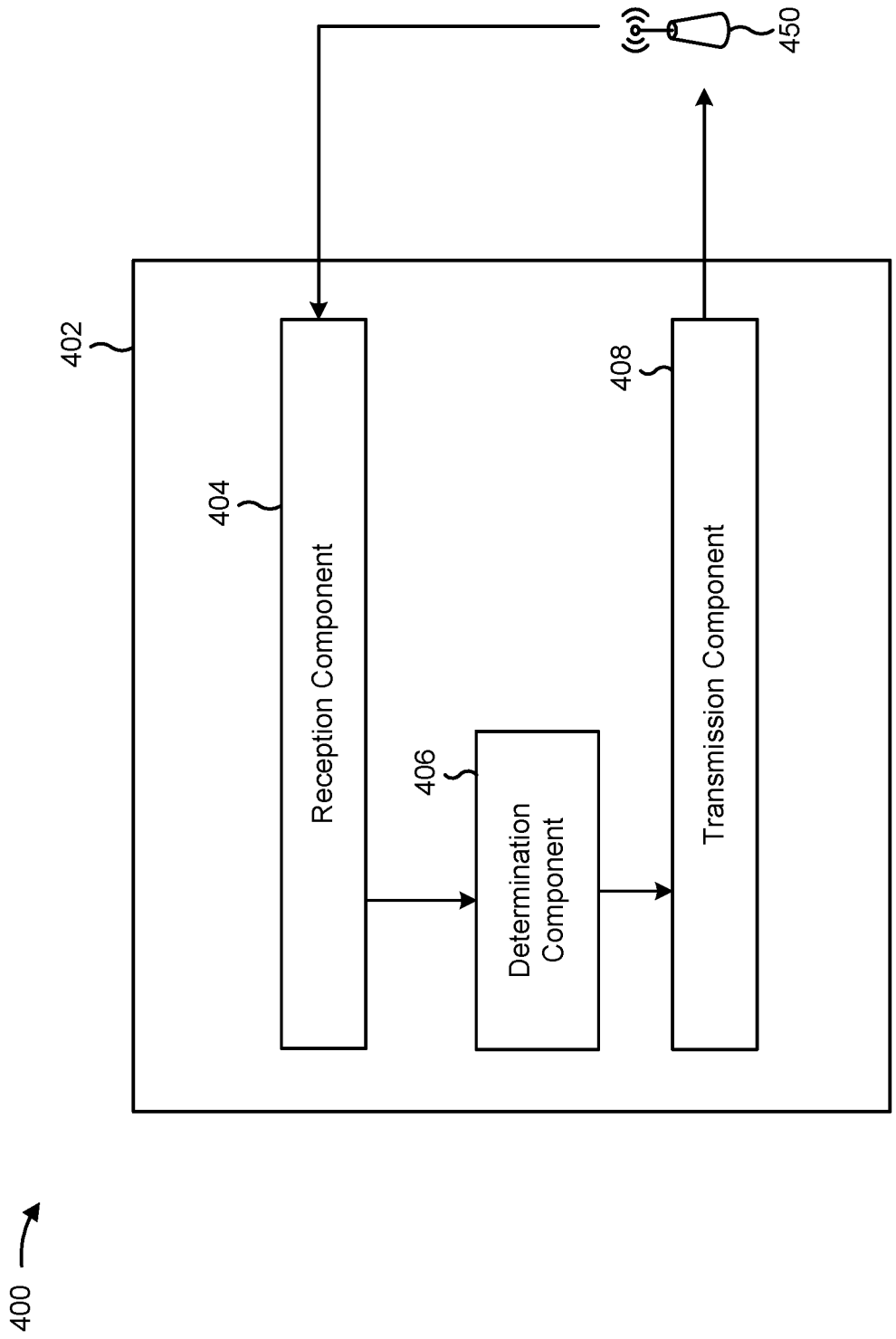
FIG. 4 is a data flow diagram illustrating an example of a data flow between different components in an example apparatus, in accordance with various aspects of the present disclosure.

FIG. 4 is a data flow diagram 400 illustrating a data flow between different components in an example apparatus 402. The apparatus 402 may be a UE (e.g., UE 120). In some aspects, the apparatus 402 includes a reception component 404, a determination component 406, and/or a transmission component 408.

As shown in FIG. 4, the reception component 404 may receive an activation command for a PLRS (e.g., that is not configured with a TCI state). For example, the reception component 404 may receive the activation command from the apparatus 450 (e.g., a BS 110). The reception component 404 may provide information relating to the activation command for the PLRS to the determination component 406.

The determination component 406 may determine an applicable time for the PLRS. In addition, the determination component 406 may estimate a pathloss using the PLRS (e.g., based at least in part on one or more measurement samples of the PLRS) and according to the applicable time for the PLRS. The determination component 406 also may determine an uplink power control parameter, and/or the like, for transmitting an uplink transmission based at least in part on the estimated pathloss. The determination component 406 may provide information relating to the uplink power control parameter, the estimated pathloss, and/or the like, to the transmission component 408.

The transmission component 408 may transmit an uplink transmission based at least in part on the uplink power control parameter, the estimated pathloss, and/or the like. For example, the transmission component 408 may transmit the uplink transmission to the apparatus 450.

The apparatus 402 may include additional components that perform each of the blocks of the algorithm in the aforementioned process 300 of FIG. 3, and/or the like. Each block in the aforementioned process 300 of FIG. 3, and/or the like, may be performed by a component and the apparatus 402 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 4 are provided as an example. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed components. Additionally, or alternatively, a set of components (e.g., one or more components) shown in FIG. 4 may perform one or more functions described as being performed by another set of components shown in FIG. 4.

Figure 5:
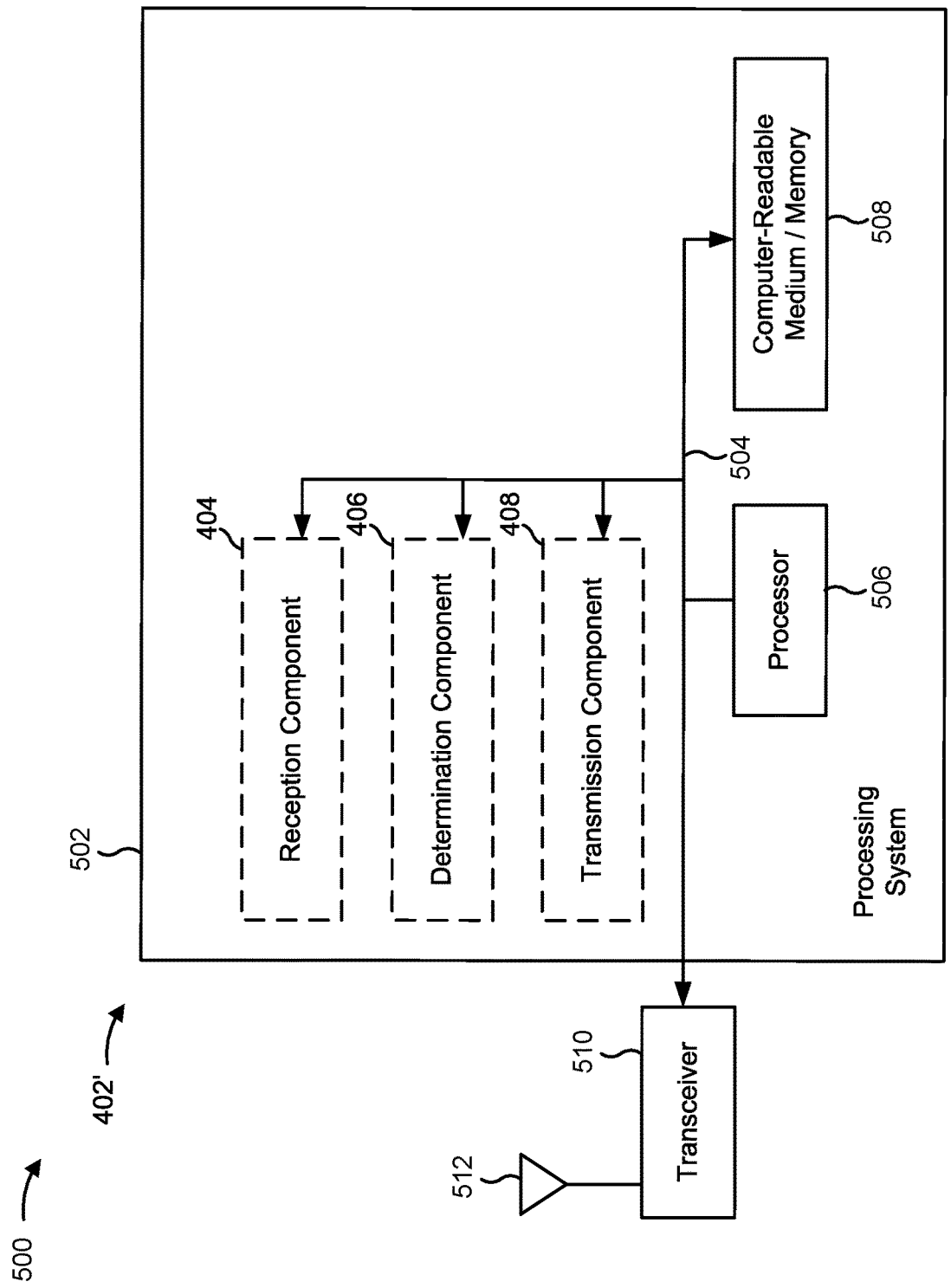
FIG. 5 is a diagram illustrating an example of a hardware implementation for an apparatus employing a processing system, in accordance with various aspects of the present disclosure.

FIG. 5 is a diagram 500 illustrating an example of a hardware implementation for an apparatus 402' employing a processing system 502. The apparatus 402' may be a UE (e.g., UE 120).

The processing system 502 may be implemented with a bus architecture, represented generally by the bus 504. The bus 504 may include any number of interconnecting buses and bridges depending on the specific application of the processing system 502 and the overall design constraints. The bus 504 links together various circuits including one or more processors and/or hardware components, represented by the processor 506, the components 404, 406, and/or 408, and the computer-readable medium/memory 508. The bus 504 may also link various other circuits such as timing sources, peripherals, voltage regulators, and power management circuits, which are well known in the art, and therefore will not be described any further.

The processing system 502 may be coupled to a transceiver 510. The transceiver 510 is coupled to one or more antennas 512. The transceiver 510 provides a means for communicating with various other apparatuses over a transmission medium. The transceiver 510 receives a signal from the one or more antennas 512, extracts information from the received signal, and provides the extracted information to the processing system 502, specifically the reception component 404. In addition, the transceiver 510 receives information from the processing system 502, specifically the transmission component 408, and based at least in part on the received information, generates a signal to be applied to the one or more antennas 512. The processing system 502 includes a processor 506 coupled to a computer-readable medium/memory 508. The processor 506 is responsible for general processing, including the execution of software stored on the computer-readable medium/memory 508. The software, when executed by the processor 506, causes the processing system 502 to perform the various functions described herein for any particular apparatus. The computer-readable medium/memory 508 may also be used for storing data that is manipulated by the processor 506 when executing software. The processing system further includes at least one of the components 404, 406, and/or 408. The components may be software modules miming in the processor 506, resident/stored in the computer readable medium/memory 508, one or more hardware modules coupled to the processor 506, or some combination thereof. The processing system 502 may be a component of the UE 120 and may include the memory 282 and/or at least one of the TX MIMO processor 266, the receive processor 258, and/or the controller/processor 280.

In some aspects, the apparatus 402/402' for wireless communication includes means for receiving an activation command for a PLRS, means for estimating a pathloss using the PLRS based at least in part on an applicable time for the PLRS that indicates a time at which the PLRS is to be ready for use in estimating the pathloss, and/or the like. The aforementioned means may be one or more of the aforementioned components of the apparatus 402 and/or the processing system 502 of the apparatus 402' configured to perform the functions recited by the aforementioned means. As described elsewhere herein, the processing system 502 may include the TX MIMO processor 266, the receive processor 258, and/or the controller/processor 280. In one configuration, the aforementioned means may be the TX MIMO processor 266, the receive processor 258, and/or the controller/processor 280 configured to perform the functions and/or operations recited herein.

FIG. 5 is provided as an example. Other examples may differ from what is described in connection with FIG. 5.

The following provides an overview of some aspects of the present disclosure:

Aspect 1: A method of wireless communication performed by a user equipment (UE), comprising: receiving an activation command for a pathloss reference signal (PLRS); and estimating a pathloss using the PLRS based at least in part on an applicable time for the PLRS that indicates a time at which the PLRS is to be ready for use in estimating the pathloss.

Aspect 2: The method of aspect 1, wherein the PLRS is a synchronization signal block or a periodic channel state information reference signal.

Aspect 3: The method of any of aspects 1-2, wherein the activation command for the PLRS is received via a medium access control control element.

Aspect 4: The method of any of aspects 1-3, wherein the applicable time is after a particular duration after acknowledgment feedback for the activation command is sent.

Aspect 5: The method of any of aspects 1-4, wherein the applicable time is after a threshold quantity of measurement samples of the PLRS are taken.

Aspect 6: The method of aspect 5, wherein counting of the threshold quantity of measurement samples of the PLRS begins after acknowledgment feedback for the activation command is sent.

Aspect 7: The method of any of aspects 1-6, wherein the applicable time is after a particular duration after a threshold quantity of measurement samples of the PLRS are taken.

Aspect 8: The method of aspect 7, wherein the particular duration corresponds to a duration used for layer 1 reference signal received power reporting.

Aspect 9: The method of any of aspects 1-8, wherein the applicable time is based at least in part on a determination of whether the PLRS is known or not known to the UE.

Aspect 10: The method of aspect 9, wherein the PLRS is determined to be known to the UE when at least one of: the activation command for the PLRS is received during a particular period of time from a last transmission of the PLRS, at least one measurement report for the PLRS has been transmitted, or at least one of the PLRS or a quasi co-located source synchronization signal block is detectable during a switching period associated with the PLRS, and a signal-to-noise ratio, associated with the PLRS, satisfies a threshold value.

Aspect 11: The method of any of aspects 9-10, wherein the PLRS is determined to be known to the UE, and the applicable time is after a threshold quantity of measurement samples of the PLRS are taken.

Aspect 12: The method of aspect 11, wherein counting of the threshold quantity of measurement samples of the PLRS begins after acknowledgment feedback for the activation command is sent.

Aspect 13: The method of aspects 9-10, wherein the PLRS is determined to be not known to the UE, and the applicable time is after a particular duration after a threshold quantity of measurement samples of the PLRS are taken.

Aspect 14: The method of aspect 13, wherein the particular duration corresponds to a duration used for layer 1 reference signal received power reporting.

Aspect 15: An apparatus for wireless communication at a device, comprising a processor; memory coupled with the processor; and instructions stored in the memory and executable by the processor to cause the apparatus to perform the method of one or more aspects of aspects 1-14.

Aspect 16: A device for wireless communication, comprising a memory and one or more processors coupled to the memory, the memory and the one or more processors configured to perform the method of one or more aspects of aspects 1-14.

Aspect 17: An apparatus for wireless communication, comprising at least one means for performing the method of one or more aspects of aspects 1-14.

Aspect 18: A non-transitory computer-readable medium storing code for wireless communication, the code comprising instructions executable by a processor to perform the method of one or more aspects of aspects 1-14.

Aspect 19: A non-transitory computer-readable medium storing a set of instructions for wireless communication, the set of instructions comprising one or more instructions that, when executed by one or more processors of a device, cause the device to perform the method of one or more aspects of aspects 1-14.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an activation command for a pathloss reference signal (PLRS); and
   estimating a pathloss using the PLRS based at least in part on an applicable time, for the PLRS, that is after the activation command is sent and indicates a time at which the PLRS is to be ready for use in estimating the pathloss, wherein the applicable time is based at least in part on whether the PLRS is known or not known to the UE, wherein the PLRS is determined to be known to the UE based at least in part on a determination that the PLRS is detectable during a switching period associated with the PLRS, and a signal-to-noise ratio, associated with the PLRS, satisfies a threshold value.

2. The method of claim 1, wherein the PLRS is a synchronization signal block or a periodic channel state information reference signal.

3. The method of claim 1, wherein the activation command for the PLRS is received via a medium access control control element.

4. The method of claim 1, wherein the applicable time is after a particular duration after acknowledgment feedback for the activation command is sent.

5. The method of claim 1, wherein the applicable time is after a threshold quantity of measurement samples of the PLRS are taken.

6. The method of claim 5, wherein counting of the threshold quantity of measurement samples of the PLRS begins after acknowledgment feedback for the activation command is sent.

7. The method of claim 1, wherein the applicable time is after a particular duration after a threshold quantity of measurement samples of the PLRS are taken.

8. The method of claim 7, wherein the particular duration corresponds to a duration used for layer 1 reference signal received power reporting.

9. The method of claim 1, wherein the PLRS is known to the UE based at least in part on whether a transmission configuration indicator (TCI) state configured for the PLRS is known to the UE.

10. The method of claim 1, wherein the PLRS is determined to be known to the UE further based at least in part on a determination that the UE has transmitted at least one measurement report for the PLRS.

11. The method of claim 9, wherein the PLRS is determined to be known to the UE, and the applicable time is after a threshold quantity of measurement samples of the PLRS are taken.

12. The method of claim 11, wherein counting of the threshold quantity of measurement samples of the PLRS begins after acknowledgment feedback for the activation command is sent.

13. The method of claim 9, wherein the PLRS is determined to be not known to the UE, and the applicable time is after a particular duration after a threshold quantity of measurement samples of the PLRS are taken.

14. The method of claim 13, wherein the particular duration corresponds to a duration used for layer 1 reference signal received power reporting.

15. A user equipment (UE) for wireless communication, comprising:
   one or more memories; and
   one or more processors coupled to the one or more memories, the one or more processors configured to:
      receive an activation command for a pathloss reference signal (PLRS); and
      estimate a pathloss using the PLRS based at least in part on an applicable time, for the PLRS, that is after the activation command is sent and indicates a time at which the PLRS is to be ready for use in estimating the pathloss, wherein the applicable time is based at least in part on whether the PLRS is known or not known to the UE, wherein the PLRS is determined to be known to the UE based at least in part on a determination that the PLRS is detectable during a switching period associated with the PLRS, and a signal-to-noise ratio, associated with the PLRS, satisfies a threshold value.

16. The UE of claim 15, wherein the PLRS is a synchronization signal block or a periodic channel state information reference signal.

17. The UE of claim 15, wherein the activation command for the PLRS is received via a medium access control control element.

18. The UE of claim 15, wherein the applicable time is after a particular duration after acknowledgment feedback for the activation command is sent.

19. The UE of claim 15, wherein the applicable time is after a threshold quantity of measurement samples of the PLRS are taken.

20. The UE of claim 19, wherein counting of the threshold quantity of measurement samples of the PLRS begins after acknowledgment feedback for the activation command is sent.

21. The UE of claim 15, wherein the applicable time is after a particular duration after a threshold quantity of measurement samples of the PLRS are taken.

22. The UE of claim 21, wherein the particular duration corresponds to a duration used for layer 1 reference signal received power reporting.

23. The UE of claim 15, wherein the PLRS is known to the UE based at least in part on whether a transmission configuration indicator (TCI) state configured for the PLRS is known to the UE.

24. The UE of claim 15, wherein the PLRS is determined to be known to the UE further based at least in part on a determination that the UE has transmitted at least one measurement report for the PLRS.

25. The UE of claim 23, wherein the PLRS is determined to be known to the UE, and the applicable time is after a threshold quantity of measurement samples of the PLRS are taken.

26. The UE of claim 25, wherein counting of the threshold quantity of measurement samples of the PLRS begins after acknowledgment feedback for the activation command is sent.

27. The UE of claim 23, wherein the PLRS is determined to be not known to the UE, and the applicable time is after a particular duration after a threshold quantity of measurement samples of the PLRS are taken.

28. The UE of claim 27, wherein the particular duration corresponds to a duration used for layer 1 reference signal received power reporting.

29. An apparatus for wireless communication, comprising:
means for receiving an activation command for a pathloss reference signal (PLRS); and
means for estimating a pathloss using the PLRS based at least in part on an applicable time, for the PLRS, that is after the activation command is sent and indicates a time at which the PLRS is to be ready for use in estimating the pathloss, wherein the applicable time is based at least in part on whether the PLRS is known or not known to the apparatus, wherein the PLRS is determined to be known to the apparatus based at least in part on a determination that the PLRS is detectable during a switching period associated with the PLRS, and a signal-to-noise ratio, associated with the PLRS, satisfies a threshold value.

30. A non-transitory computer-readable medium storing a set of instructions for wireless communication, the set of instructions comprising:
one or more instructions that, when executed by one or more processors of a user equipment (UE), cause the UE to:
receive an activation command for a pathloss reference signal (PLRS); and
estimate a pathloss using the PLRS based at least in part on an applicable time, for the PLRS, that is after the activation command is sent and indicates a time at which the PLRS is to be ready for use in estimating the pathloss, wherein the applicable time is based at least in part on whether the PLRS is known or not known to the UE, wherein the PLRS is determined to be known to the UE based at least in part on a determination that the PLRS is detectable during a switching period associated with the PLRS, and a signal-to-noise ratio, associated with the PLRS, satisfies a threshold value.

* * * * *